United States Patent [19]
Williams

[11] Patent Number: 5,383,769
[45] Date of Patent: Jan. 24, 1995

[54] RETROFIT STRAINER ATTACHMENT FOR GASOLINE PUMPS

[75] Inventor: Jeffrey R. Williams, East Moline, Ill.

[73] Assignee: The Marley Pump Company, Mission, Kans.

[21] Appl. No.: 192,368

[22] Filed: Feb. 7, 1994

[51] Int. Cl.⁶ .................. F04B 19/00; B01D 29/15
[52] U.S. Cl. .................. 417/238; 417/313; 210/232; 210/416.1; 210/416.4
[58] Field of Search ............. 417/238, 313, 423.3, 417/423.9; 92/78; 210/232, 416.1, 416.4

[56] References Cited

U.S. PATENT DOCUMENTS

| | | | |
|---|---|---|---|
| 1,502,552 | 7/1924 | Donnallan | 210/232 |
| 2,218,003 | 2/1937 | Hawley, Jr. | |
| 2,492,141 | 3/1945 | Gaylord | |
| 2,996,994 | 6/1955 | Wright | |
| 3,011,446 | 2/1956 | Tsiguloff | |
| 3,617,157 | 11/1971 | Phillips | 417/238 |
| 3,954,618 | 5/1976 | Strauss | 210/232 |
| 4,123,361 | 10/1978 | Marschman | 210/232 |
| 4,340,476 | 7/1982 | Potz et al. | 210/232 |
| 4,966,534 | 10/1990 | Hasslen, III | |

Primary Examiner—Richard A. Bertsch
Assistant Examiner—Roland G. McAndrews, Jr.
Attorney, Agent, or Firm—Kokjer, Kircher, Bowman & Johnson

[57] ABSTRACT

A strainer attachment for the inlet fitting of a submersible pump. A threaded rod carries two retainer elements, one of which is rigidly mounted on one end of the rod and the other of which is threaded onto the rod. With the rod held in a skewed position, the stationary retainer element can be passed through the inlet passage formed in the inlet fitting. When the rod is then oriented in alignment with the pump axis, the retainer elements span the inlet opening. When the movable retainer element is threaded toward the stationary element and against the inlet plate of the inlet fitting, the two retainer elements grip the inlet plate between them to secure the rod in place. A strainer body having mesh openings for straining the liquid that is being pumped can be threaded onto the rod.

8 Claims, 1 Drawing Sheet

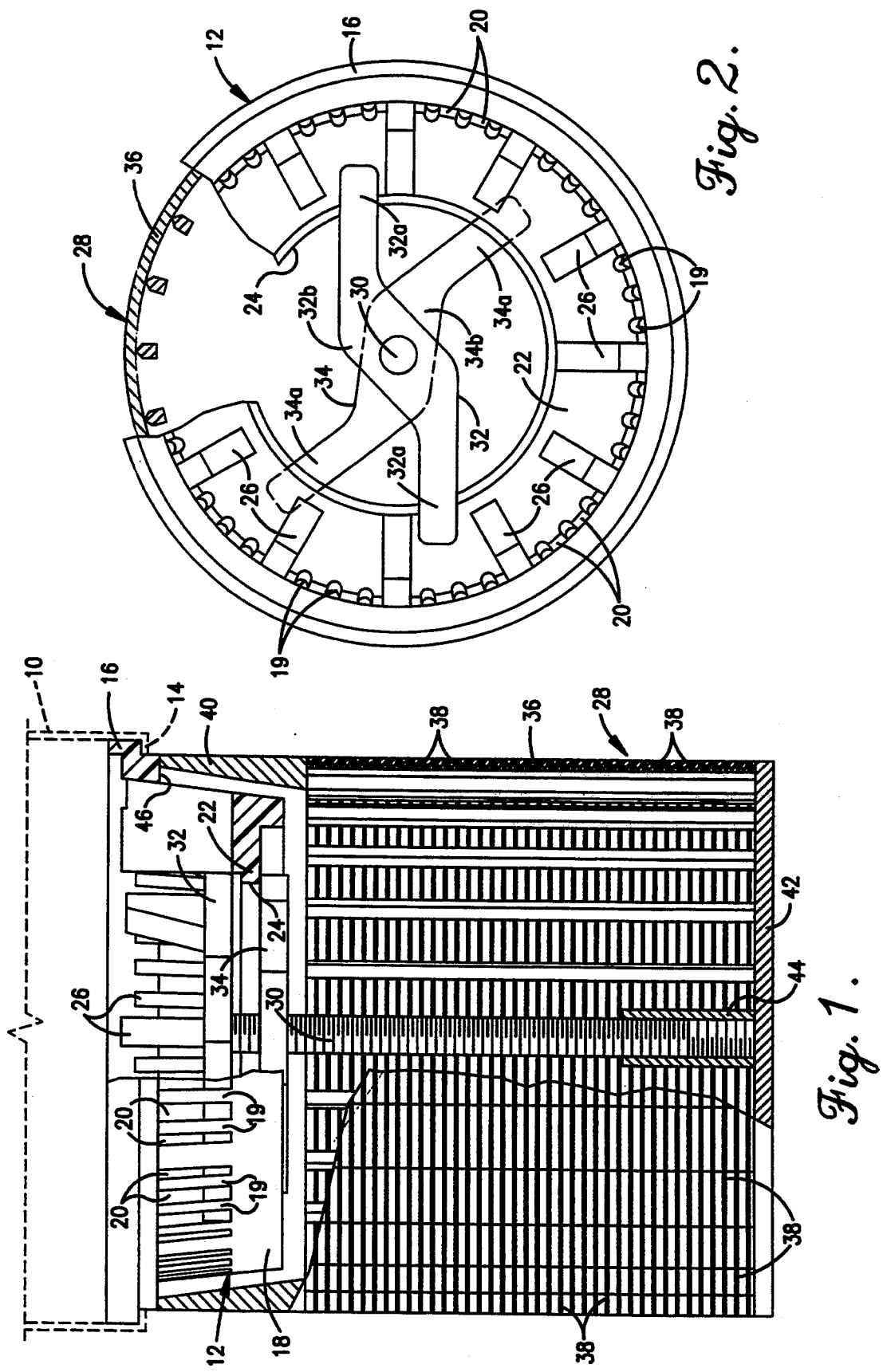

RETROFIT STRAINER ATTACHMENT FOR GASOLINE PUMPS

FIELD OF THE INVENTION

This invention relates generally to pumps and more specifically to a strainer attachment having particular application to submersible pumps of the type used to pump petroleum products.

BACKGROUND OF THE INVENTION

At gasoline service stations, gasoline is stored in large, underground tanks and is pumped from the tanks to above ground dispensers from which the gasoline is dispensed. Submersible pumps are normally used to carry out the pumping operation. In this type of application and in other pumping applications, it is common for the liquid which is being pumped to contain particulate matter. Screen type filters are often provided at the dispensing station in order to prevent the particles from being dispensed along with the gasoline. However, the provision of filters at the dispenser is not an entirely satisfactory solution. The filters can become clogged and must be cleaned and/or replaced at frequent intervals. Also, the particulate matter that passes through the pump can cause damage to bearings and other pump components and thus decrease the useful life of the pump.

It has been proposed to provide inlet strainers on pumps of various types in order to prevent particulate materials from reaching the pump inlet port. In addition to preventing damage to the pump and reducing the maintenance requirements of the dispenser, the use of a pump inlet strainer has the further advantage of allowing back washing of the particulate matter when the pump is not operating.

SUMMARY OF THE INVENTION

The present invention is directed to a pump strainer attachment which can be installed as original equipment or retrofitted on an existing pump. It is a particular advantage of the invention that the inlet strainer can be added to pumps that are not originally equipped with a strainer.

In accordance with the invention, a rod is provided with two retainer elements, one of which is located on one end of the rod. This retainer element can be passed through the inlet passage of an inlet fitting on the base of the pump while held at an angular orientation with the rod in a skewed position. The rod can then be straightened and aligned with the pump axis which coincides with the axis of the inlet passage. The second retainer element can then be moved along the rod toward the first element, preferably by threading it along the rod. When the movable retainer element has been tightened against the inlet plate of the fitting, the inlet plate is securely gripped between the two retainer elements. This gripping action provided by the retainer element mounts the rod to the inlet fitting at a location centered on the pump inlet passage.

A generally cylindrical strainer body having small mesh openings is then applied to the rod. Preferably, the strainer has a threaded connection with the rod so that it can simply be screwed onto the rod until its rim is tightly engaged against the inlet fitting. The strainer is then secured in place to strain the gasoline or other fluid that is being handled by the pump, thus preventing large particles from reaching the pump inlet. When the pump is not operating, particulate matter can be cleared from the strainer through back washing.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a strainer attachment mounted to a pump in accordance with a preferred embodiment of the present invention, with the pump shown fragmentarily in broken lines and portions of the strainer assembly broken away for purposes of illustration; and FIG. 2 is a top plan view of the strainer attachment shown in FIG. 1, with a portion broken away for purposes of illustration.

DETAILED DESCRIPTION OF THE INVENTION

Referring now to the drawings in more detail and initially to FIG. 1 in particular, numeral 10 designates the base or inlet end of a submersible pump of the type commonly used to pump petroleum products such as gasoline from underground storage tanks. An inlet fitting which is generally identified by numeral 12 is mounted to the base end of the pump body 10. An in turned lip 14 on the lower end of the pump body 10 underlies a flange 16 on the periphery of the inlet fitting 12, thus holding the inlet fitting in place on the base of the pump.

The inlet fitting 12 is a cup-shaped structure having a frusto conical wall portion 18 which tapers as it extends downwardly from the peripheral flange 16. The upper part of wall 18 is formed by spaced apart slats 19 which present slots 20 between them. An annular plate 22 connects with the lower portion of the wall 18. A circular inlet passage 24 is formed centrally in the plate 22 and provides an inlet port which admits fluid to the pump. As best shown in FIG. 2, the interior surface of the tapered wall 18 is provided with a series of ribs 26 which connect at their lower ends with the plate 22.

In accordance with the present invention, a strainer which is generally identified by numeral 28 is mounted to the inlet fitting 12 by means of a retainer assembly which includes a threaded rod 30 and upper and lower retainer elements 32 and 34. As best shown in FIG. 2, the upper retaining element 32 may take the general form of an arm having straight opposite end portions 32a connected by a wider center portion 32b which angles between the end portions 32a. The length of the element 32 between the tips of end portions 32a is slightly greater than the diameter of the circular inlet passage 24 so that the retainer element is able to extend completely across the passage 24 and overlie diametrically opposed parts of the annular plate 22.

The center of the upper retaining element 32 is welded or otherwise rigidly secured to one end of the rod 30 and is oriented generally perpendicular to the rod. It is noted that the element 32 can be extended through the passage 24 when it is in an angular orientation with the rod 30 skewed relative to the main axis of the pump or at an acute angle relative to the position of the rod shown in FIG. 1.

The other retaining element 34 is identical in size and shape to element 32. Opposite end portions 34a of element 34 are parallel to one another and are connected by a wider central portion 34b. Element 34 takes the general form of an arm having a length slightly greater than the diameter of the inlet passage 24.

The central portion 34b of element 34 has an internally threaded opening which is threaded onto the externally threaded rod 30. This threaded connection allows element 34 to be moved axially along the rod 30 toward and away from element 32 simply by turning element 34 in opposite directions.

The strainer 28 has a generally cylindrical body 36 having a wire mesh construction providing small mesh openings 38 which are effective to prevent particulate matter larger than the mesh openings from passing through the strainer into its hollow interior. A solid metal band 40 forms the upper portion of the wall 36. The strainer body 28 has a solid discoidal bottom 42. An internally threaded sleeve 44 extends upwardly from the center of the bottom 42 and is open at the top in order to receive the rod 30.

The strainer 28 is applied to the inlet fitting 12 by initially positioning the lower retainer element 34 well away from the upper element 32 on the rod 30. This is accomplished by turning element 34 in a direction to screw it away from element 32. Then, the rod 30 is held at a skewed angle relative to the axis of the pump, and the upper element 32 is passed through the inlet passage 24 in a skewed or angular position. After the element 32 has been extended completely through the passage 24, the rod 30 can be straightened out to a position in which it is aligned with the pump axis and centered on the center of the passage 24. The element 32 is located above plate 22, with the tips of the opposite end portions 32a resting on the top or interior side of plate 22, as shown in FIG. 2.

The lower element 34 is then turned in a direction to advance it along rod 30 by threaded action toward the upper element 32. Eventually, element 34 reaches a position in which its arms 34a are engaged against the bottom or exterior side of plate 22. In this position of the parts, the two retaining elements 32 and 34 grip the plate 22 between them. When element 34 is fully tightened against the underside of plate 22, the two elements 32 and 34 securely grip plate 22 between them, and this secures rod 30 rigidly in place at a position centered on the pump axis and the center of passage 24. The threaded connection between element 34 and rod 30 assures that the retainer elements 32 and 34 will remain in place.

The strainer 28 is then applied to the rod 30. This is accomplished by fitting the sleeve 44 onto the lower end of rod 30 and then turning the strainer 28 in a direction to thread the sleeve 44 onto rod 30. The band 40 is thus pulled upwardly and is eventually drawn against a flat shoulder 46 which extends outwardly from the top end of the tapered wall 18. When the strainer 28 is fully tightened, the top edge of the band 40 is tightly engaged against the shoulder 46. The ends of element 32 engage the ribs 26 to prevent element 32 and rod 30 from turning while element 34 or strainer 28 is being threaded on the rod 30.

In this manner, the strainer body 28 can be installed on a pump that was not originally equipped with a strainer. The strainer can also be installed on a pump as original equipment. In either event, the liquid that is drawn into the pump inlet passage 24 must pass through the mesh openings 38 in order to be admitted to the pump, and the mesh openings 38 act to prevent particulate matter from reaching the inlet passage. When the pump is not in operation, the particulate matter which tends to collect on the outside of wall 36 is removed through back washing.

It is noted that the threaded connection between rod 30 and sleeve 44 allows the strainer 28 to be removed if necessary. In addition, the lower retainer element 34 can be threaded away from the upper element far enough to allow rod 30 to be placed in a skewed position such that the upper element 32 can be withdrawn through passage 24 at the necessary angle if it is desired to detach the retainer assembly.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. In combination with a submersible pump having an inlet fitting presenting a plate through which an inlet passage extends to admit liquid to the pump, the improvement comprising:
   a threaded rod having one end carrying a first retainer element sized to be passed through said inlet passage in a skewed position of the rod, said first retainer element being rigidly connected with said rod and being engageable with an interior side of said plate when the rod is oriented in a non-skewed position generally aligned with the center of the inlet passage;
   a second retainer element having a direct threaded connection with said rod to permit the second retainer element to be threaded against an exterior side of said plate in opposition to said first retainer element to secure the rod in the non-skewed position upon tightening of said second retainer element against the plate;
   a strainer applicable to said inlet fitting and presenting mesh openings allowing fluid flow therethrough but preventing particulate matter from reaching the inlet passage; and
   means for threading said strainer onto the rod to hold the strainer against said inlet fitting.

2. The improvement of claim 1, wherein each retainer element comprises an arm having a length sufficient to span the inlet passage.

3. The improvement of claim 1, including means on said plate for preventing said first retainer element and said rod from turning while said second retainer element is being threaded on said rod toward said plate.

4. The improvement of claim 1, including a plurality of ribs on said plate engageable with end portions of said first retainer element to prevent said first retainer element and said rod from turning while said second retainer element is being threaded on said rod toward said plate.

5. A strainer attachment for a submersible pump having a pump body and an inlet fitting presenting a plate with an inlet passage therethrough for admitting liquid to the pump body, said attachment comprising:
  an elongated rod carrying a first retainer element thereon having a size to be passed through said inlet passage with said rod in a skewed position, said first retainer element being rigidly connected with said rod and having end portions engageable with one side of said plate when the rod is oriented in a non-skewed position generally aligned with the center of the inlet passage;
  a second retainer element on said rod spaced from the first retainer element and having a direct threaded connection with the rod to permit said second retainer element to be threaded on the rod against a side of the plate opposite said one side to secure said second retainer element against said opposite side of the plate to mount said rod to the inlet fitting in said non-skewed position;
  a strainer adapted to be fitted to said inlet fitting and constructed with mesh openings effective to prevent particulate matter from reaching the inlet passage; and
  means for threading said strainer onto the rod in a manner to hold the strainer against said inlet fitting.

6. The attachment of claim 5, wherein each retainer element comprises an arm having a length sufficient to span the inlet passage.

7. The attachment of claim 5, including means on said plate for preventing said first retainer element and said rod from turning while said second retainer element is being threaded on said rod toward said plate.

8. The attachment of claim 5, including a plurality of ribs on said plate engageable with end portions of said first retainer element to prevent said first retainer element and said rod from turning while said second retainer element is being threaded on said rod toward said plate.

* * * * *